US011533656B2

(12) United States Patent
Han et al.

(10) Patent No.: US 11,533,656 B2
(45) Date of Patent: Dec. 20, 2022

(54) METHOD OF TRAFFIC AND CONGESTION CONTROL FOR A NETWORK WITH QUALITY OF SERVICE

(71) Applicant: Huawei Technologies Co., Ltd., Shenzhen (CN)

(72) Inventors: Lin Han, San Jose, CA (US); Yingzhen Qu, San Jose, CA (US); Lijun Dong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/010,563

(22) Filed: Sep. 2, 2020

(65) Prior Publication Data

US 2020/0404536 A1 Dec. 24, 2020

Related U.S. Application Data

(63) Continuation of application No. PCT/US2019/020307, filed on Mar. 1, 2019.

(60) Provisional application No. 62/637,917, filed on Mar. 2, 2018.

(51) Int. Cl.
*H04W 28/02* (2009.01)
*H04L 43/0829* (2022.01)
*H04W 24/08* (2009.01)
*H04W 28/20* (2009.01)

(52) U.S. Cl.
CPC ..... *H04W 28/0289* (2013.01); *H04L 43/0829* (2013.01); *H04W 24/08* (2013.01); *H04W 28/0236* (2013.01); *H04W 28/20* (2013.01)

(58) Field of Classification Search
CPC .......................... H04W 28/02; H04W 28/0289
See application file for complete search history.

(56) References Cited

U.S. PATENT DOCUMENTS

| 6,493,316 | B1 * | 12/2002 | Chapman | H04L 47/193 |
| | | | | 370/231 |
| 6,643,259 | B1 | 11/2003 | Borella et al. | |
| 9,203,755 | B1 * | 12/2015 | Wong | H04L 41/5019 |
| 2005/0117515 | A1 * | 6/2005 | Miyake | H04L 47/10 |
| | | | | 370/231 |

(Continued)

FOREIGN PATENT DOCUMENTS

EP  0991244 A2  4/2000

OTHER PUBLICATIONS

Han, L., et al., "IPv6 in-band signaling for the support of transport with QoS," draft-han-6man-in-band-signaling-for-transport-qos-00, Oct. 11, 2017, 40 pages.

(Continued)

*Primary Examiner* — Sulaiman Nooristany
(74) *Attorney, Agent, or Firm* — Conley Rose, P.C.

(57) ABSTRACT

The disclosure includes a method of performing congestion control by a server device in a network. The method includes setting an effective window equal to a congestion window; sending traffic including the effective window to a client device; receiving an acknowledgment (ACK) from the client device; incrementing the congestion window if the ACK is not a duplicate; and updating the effective window based at least partly on the incremented congestion window.

17 Claims, 9 Drawing Sheets

(56) References Cited

U.S. PATENT DOCUMENTS

2015/0334596 A1* 11/2015 Szilagyi ............... H04L 47/12
370/232
2017/0346750 A1* 11/2017 Wang .................... H04L 1/1825

OTHER PUBLICATIONS

Han, L., et al., "A New Congestion Control in Bandwidth Guaranteed Network," draft-han-tsvwg-cc-00, Mar. 3, 2018, 11 pages.

* cited by examiner

```
At start: /* new slow-start */
EffectiveWND = CongestionWND = IW (Initial Window) = MinBandwidthWND
Host sends traffic with EffectiveWND, the initial RTT can be decided from historical data or set by the
    administer.
When Sender receives ACK:
If (ACK is not dup) { /* no congestion and no loss, new sliding window algorithm */
    Update average RTT, MinBandwidthWND and MaxBandwidthWND
    If (CongestionWND == 1) { /* new fast recovery */
        CongestionWND = MinBandwidthWND; /* new fast recover */
    } Else if (CongestionWND < MaxBandwidthWND) {
        CongestionWND += 1, /* new feedback (AIMD) */
    } else {
        CongestionWND = MaxBandwidthWND;
    }
    EffectiveWND = min (CongestionWND , AdvertisedWND) – (LastByteSent– LastByteAcked);
    Host sends traffic with EffectiveWND;
} else if (ACK is dup and dup count >=3) { /* packet lost, new congestion avoidance algorithm*/
    If (Sender detects RED before) { /* packet lost due to congestion */
        CongestionWND = MinBandwidthWND
        EffectiveWND = min (CongestionWND , AdvertisedWND) – (LastByteSent– LastByteAcked);
        Host sends traffic with EffectiveWND;
    } else { /* packet lost due to physical failure */
        If (no timeout) {/* random physical failure */
            No changes to CongestionWND and EffectiveWND;
            Host sends traffic with EffectiveWND.
        } else { /long term physical failure */
            EffectiveWND = CongestionWND = 1
            Host sends traffic with EffectiveWND;
        }
    }
} else /* ACK is dup but dup count <3, this does not indicate the packet loss */
    No changes to CongestionWND and EffectiveWND;
        Host sends traffic with EffectiveWND.
}
```

FIG. 4

METHOD OF TRAFFIC AND CONGESTION CONTROL FOR A NETWORK WITH QUALITY OF SERVICE

CROSS-REFERENCE TO RELATED APPLICATIONS

This patent application is a continuation of International Patent Application No. PCT/US2019/020307, filed on Mar. 1, 2019, which claims the benefit of U.S. Provisional Patent Application No. 62/637,917, filed Mar. 2, 2018 by Lin Han, et al., and titled "Method of Traffic and Congestion Control for a Network with Quality of Service," all of which are hereby incorporated by reference.

TECHNICAL FIELD

The present disclosure is generally related to packet routing, and is specifically related to traffic and congestion control for a network.

BACKGROUND

Internet Protocol (IP) is a widely used technology at layer 3 of the Open System Interconnection (OSI) model (also known as the network layer), while Transmission Control Protocol (TCP) and User Datagram Protocol (UDP) are widely used at layer 4 (also known as the transport layer of the OSI model) for an IP network. The design of the Internet protocols is based on the end-to-end principle. The network infrastructure is often considered to be unreliable at any single network element or transmission medium, as the availability of links and nodes can dynamically change. There is generally no central monitoring or performance measurement facility that exists to track or maintain the state of the network. For the benefit of reducing network complexity, the intelligence in the network may be purposely located at the end nodes. As a consequence of this design, an IP network may be limited to providing best-effort delivery service, i.e., without assurances as to Quality of Service (QoS), bandwidth, processing time, etc. In addition, each device may compete with one another for their respective share of the bandwidth in an IP network, which may employ a fairness principle to ensure that the bandwidth is shared equally among the devices. The IP network may also employ congestion control algorithms (e.g., slow start, congestion avoidance, fast retransmit, fast recovery, etc.) to manage IP connections and avoid congestion. For example, the IP network may inevitably experience congestion, particularly at aggregation devices such as a gateway. The IP network may detect congestion in such cases using various methods, e.g., based on packet loss, round trip time (RTT), etc. Upon detecting congestion, a source device may adjust a window size to control the quantity of data that may be adjusted (e.g., reduced).

SUMMARY

A first aspect of the disclosure relates to a method of performing congestion control by a server device in a network. The method may comprise setting an effective window equal to a congestion window, sending traffic including the effective window to a client device, receiving an acknowledgment (ACK) from the client device, incrementing the congestion window if the ACK is not a duplicate, and updating the effective window based at least partly on the incremented congestion window.

A second aspect of the disclosure relates to a server device comprising a non-transitory memory having instructions and a processor configured to execute the instructions such that the server device implements a method. The method includes setting an effective window equal to a congestion window, sending traffic including the effective window to a client device, receiving an acknowledgment (ACK) from the client device, incrementing the congestion window if the ACK is not a duplicate, and updating the effective window based at least partly on the incremented congestion window.

A third aspect of the disclosures relates to a non-transitory computer medium storing computer readable instructions adapted to be executed by a processor to implement a method of performing congestion control by a server device in a network. The method includes setting an effective window equal to a congestion window, sending traffic including the effective window to a client device, receiving an acknowledgment (ACK) from the client device, incrementing the congestion window if the ACK is not a duplicate, and updating the effective window based at least partly on the incremented congestion window.

The disclosed methods facilitate detecting and controlling congestion for a bandwidth guaranteed network. To this end, the methods may employ novel start, feedback control, and/or fast recovery algorithms according to the present disclosure. A novel start algorithm may allow a sender to send data packets pursuant to a congestion window set to a minimum bandwidth window, while ensuring that an effective window size does not fall below the minimum bandwidth window when packet losses occur for reasons other than a timeout. A novel feedback control algorithm may ensure that the congestion window is not reduced when packet losses occur due to random physical failures. When packet losses occur due to a timeout, a novel fast recovery algorithm may be employed to recover the congestion window once a successful packet transmission occurs (i.e., rather than gradually increasing the congestion window during a slow start period).

In a first implementation form of the method according to the first, second, or third aspects of the disclosure, the method further includes determining whether packet loss has occurred in the network in response to determining that the ACK is a duplicate ACK that has been previously received by the server device, and determining that packet loss has not occurred if the server device has not received the duplicate ACK at least a predetermined number of times.

In a second implementation form of the method according to the first, second, or third aspect or any implementation thereof, the method further includes determining whether packet loss has occurred in the network responsive to determining that the ACK is a duplicate ACK that has been previously received by the server device, and determining that a packet loss has occurred if a number of times that the server device has received the duplicate ACK is greater than or equal to a predetermined threshold.

In a third implementation form of the method according to the first, second, or third aspect or any implementation thereof, the method further includes determining that the packet loss was likely caused by congestion if the server device receives a random early detection (RED) signal from the client device prior to the number of times that the server device has received the duplicate ACK reaches the predetermined threshold, determining that the packet loss was likely due to physical failure if the server device does not receive the RED signal before the number of times that the server device received the duplicate ACK reaches the predetermined threshold.

In a fourth implementation form of the method according to the first, second, or third aspect or any implementation thereof, the method further includes determining that the packet loss was likely due to physical failure comprises at least one of: determining that the packet loss was likely caused by a permanent physical failure if the network device detected the packet loss due to a timeout, or determining that the packet loss was likely caused by a random physical failure.

In a fifth implementation form of the method according to the first, second, or third aspect or any implementation thereof, the method further includes setting the congestion window equal to one packet upon determining that the packet loss was likely caused by the permanent physical failure, and increasing the congestion window from one packet to a minimum bandwidth window responsive to receiving a non-duplicate ACK.

In a sixth implementation form of the method according to the first, second, or third aspect or any implementation thereof, the method further includes reducing the congestion window to a minimum bandwidth window upon determining that the packet loss likely occurred due to congestion.

In a seventh implementation form of the method according to the first, second, or third aspect or any implementation thereof, the minimum bandwidth window corresponds to a committed information rate (CIR).

In an eighth implementation form of the method according to the first, second, or third aspect or any implementation thereof, the method further includes receiving an advertised window from the client device, and updating the effective window based upon the following formula:

$$\text{EffectiveWND} = \min(\text{CongestionWND}, \text{AdvertisedWND}) - (\text{LastByteSent} - \text{LastByteAcked}),$$

where EffectiveWND represents the effective window, CongestionWND represents the congestion window, AdvertisedWND represents the advertised window, LastByteSent represents the last byte sent by the server device, and LastByteAcked represents the last byte acknowledged by the server device.

In a ninth implementation form of the method according to the first, second, or third aspect or any implementation thereof, the effective window indicates an amount of data that the server device is capable of sending, the congestion window indicates a maximum amount of data that can be sent on a connection without being acknowledged, and the advertised window indicates a limit on an amount of data that the client device is capable of receiving.

In a tenth implementation form of the method according to the first, second, or third aspect or any implementation thereof, incrementing the congestion window comprises setting the congestion window less than or equal to a peak information rate (PIR).

A fourth aspect of the disclosures relates to a server device that includes means for setting an effective window equal to a congestion window, means for sending traffic including the effective window to a client device, means for receiving an acknowledgment (ACK) from the client device, means for incrementing the congestion window if the ACK is not a duplicate, and means for updating the effective window based at least partly on the incremented congestion window.

The means of the server device facilitate detecting and controlling congestion for a bandwidth guaranteed network. To this end, the server device may employ novel start, feedback control, and/or fast recovery algorithms according to the present disclosure. These and other features are detailed below.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates pseudo-code for implementing a congestion control scheme according to an embodiment of the disclosure.

DETAILED DESCRIPTION

Figure 1:
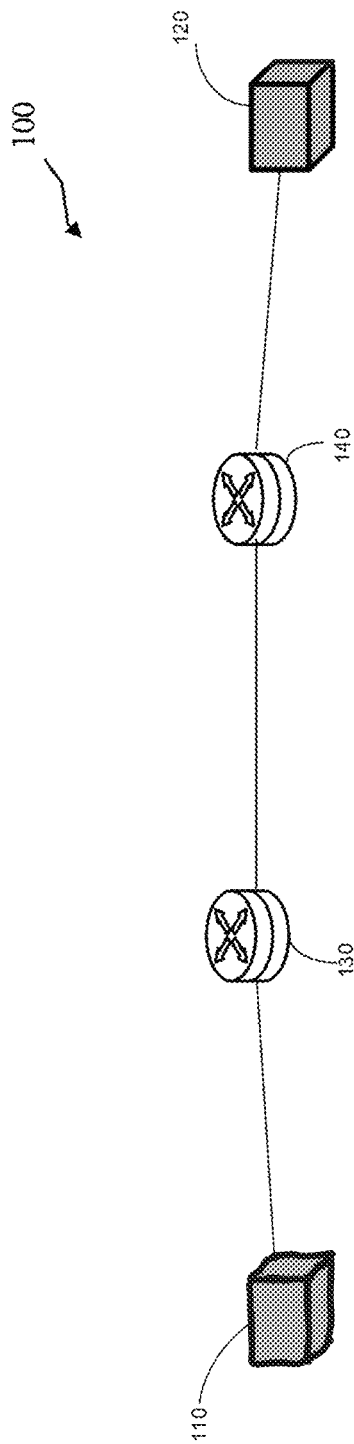
FIG. 1 is a schematic diagram of a network according to an embodiment of the disclosure.

FIG. 1 is a schematic diagram of a network 100 according to an embodiment of the disclosure. The network 100 includes a client device 110, a server device 120, and routers 130 and 140 coupling the client device 110 with the server device 120. The client device 110 and the server device 120 may send Internet Protocol (IP) packets to each other via the routers 130 and 140. Such IP packets may include IP version 4 (IPv4) packets and/or IP version 6 (IPv6) packets. In some embodiments, the network 100 may include more routers between the client device 110 and the server device 120. However, in the interest of brevity, only two routers 130, 140 are shown in FIG. 1. The client and server devices 110 and 120 may comprise personal computers, servers, smartphones, laptops, etc. In some embodiments, the network 100 may employ QoS models to manage network resources (e.g., bandwidth) and/or performance (e.g., delay, jitter, packet loss, etc.). Such models may include a Multiprotocol Label Switching (MLS) model, a Resource Reservation Protocol (RSVP), an Integrated Services (InterServ) model, and/or a Differentiated Services (DifferServ) model.

In general, the server device 120 may aim to provide services to the client device 110 based on parameters such as committed information rate (CIR) and peak information rate (PIR). CIR represents the guaranteed rate or minimum bandwidth required for user data, while PIR represents the maximum rate or bandwidth for user data. To maximize bandwidth utilization, the server device 120 may guarantee CIR to the client device 110, but not PIR. For instance, so long as the data rate for the client device 110 is less than or equal to the CIR, the server device 120 may conclude that the network 100 is not experiencing congestion, and therefore, data of the client device 110 may be delivered. However, if the data rate exceeds the CIR, the server device 120 may infer that the network 100 might be experiencing congestion, in which case data of the client device 110 may or may not be delivered, e.g., depending upon link traffic. By comparison, if the data rate exceeds the PIR, the server device 120 concludes that the network 100 is congested, in which case data of the client device 110 may be discarded. To manage congestion in such cases, the server device 120 may employ one or more congestion control schemes.

For instance, the server device 120 may employ a congestion window and a slow start algorithm to manage congestion for transmission control protocol (TCP) applications. The congestion window may indicate a maximum amount of data that can be sent on a connection without being acknowledged. The congestion window may be used to limit the total number of packets that a sender can transmit into the network 100 before receiving an acknowledgment (ACK), while the slow start algorithm may be used to increase the congestion window after a TCP connection is initialized or after the occurrence of a timeout (TO), e.g., when a sender fails to receive an ACK for a packet within a timeout period, which may be based on round trip time (RRT) measurement.

When a TO occurs in a typical TCP application, the sender may interpret the TO as an indication of congestion. After detecting a TO, the server device 120 may reset the congestion window to one maximum segment size (MSS) and initiate a slow start procedure. During slow start, the server device 120 may increment the congestion window by one segment for each ACK received until the congestion window reaches a slow start threshold (ssthresh). While congestion avoidance may be managed using a slow start algorithm and congestion window such as described above, there is presently no procedure for traffic and congestion control in a QoS-guaranteed network.

For example, a source application running on the client device 110 often does not receive or transmit traffic at accurate rates since data associated with the source application may vary. One reason data associated with the source application may vary is because such data may not always be present, and therefore, the source application cannot receive or transmit traffic at a constant rate.

Disclosed herein is a method of congestion and traffic control in a network configured to provide users (e.g., client device 110) with QoS guarantees. As will be more fully explained below, the method involves setting an initial congestion window to a minimum guaranteed bandwidth when a TCP session is established. In the absence of packet loss, the congestion window may be incremented (e.g., by one segment) each instant a non-duplicative ACK is received until a maximum bandwidth window is reached. Upon detecting a packet loss, the congestion window may be reduced to the minimum guaranteed bandwidth, but only if the packet loss is detected after receiving a Random Early Detection (RED) signal. Otherwise, the congestion window may be maintained. Upon detecting a packet loss due to a TO, the congestion window may be reduced to one. Thereafter, the congestion window may be incremented by one for each ACK received until the maximum bandwidth window is reached.

Figure 2:
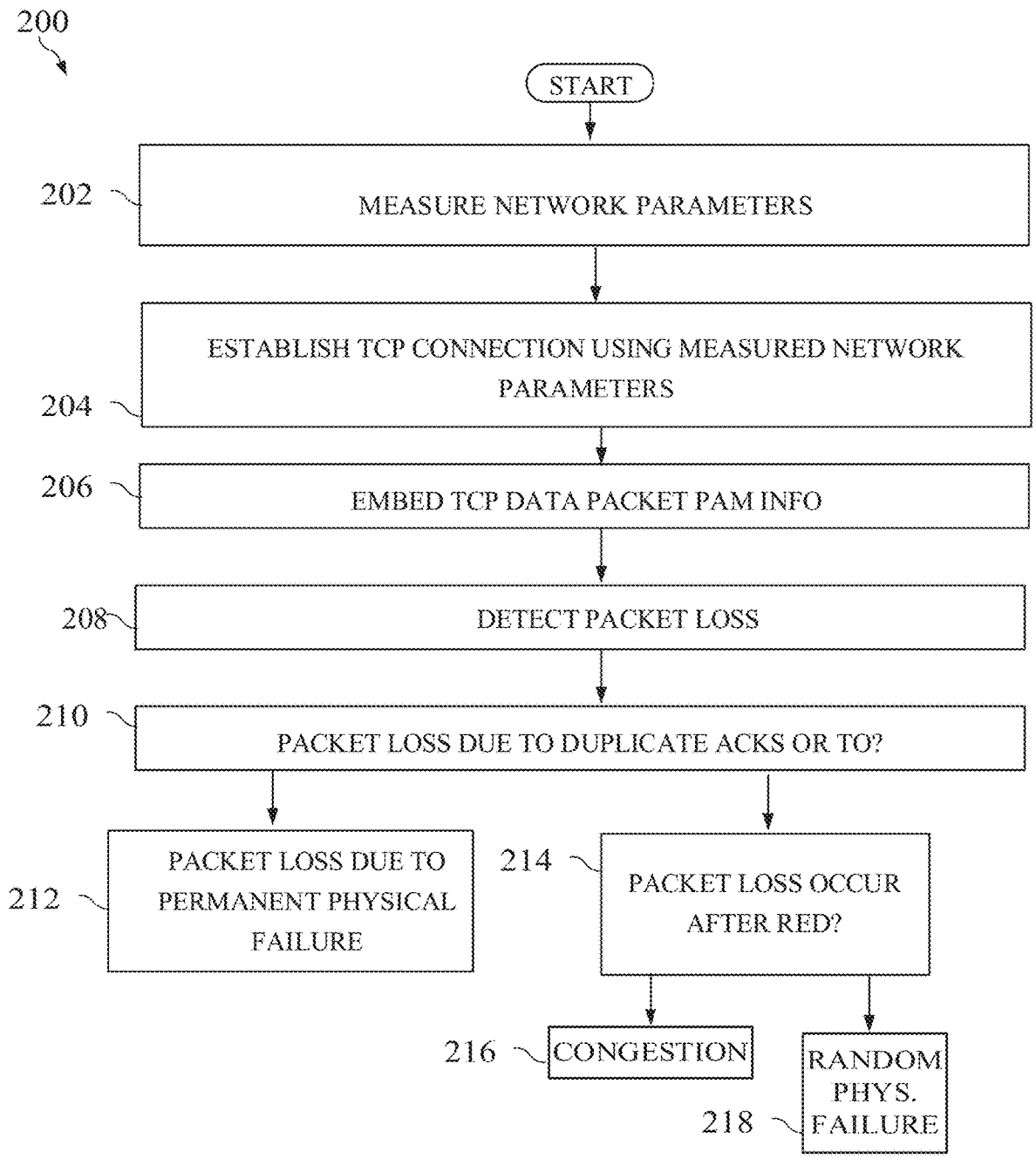
FIG. 2 illustrates a method of detecting network congestion according to an embodiment of the disclosure.

FIG. 2 illustrates a method 200 of detecting congestion in a network such as the network 100 of FIG. 1. At block 202, the method 200 may measure network parameters to setup a TCP connection between an application and system, which may reside at the client device 110 and server device 120, respectively. In some aspects, the method 200 may use an Operations, Administration, and Maintenance (OAM) mechanism to monitor the network 100 and measure parameters such as hop number, RTT, average RTT, router information (e.g., describing the capability of routers 130 and 140). Such measurements may be performed by the application or sender. Furthermore, network parameters may be measured as described in U.S. application Ser. No. 15/714,685 entitled "Quality of Service for Data Transmission."

In some embodiments, network parameters may be measured by the application at the client device 110, by the system at the server device 120, or both. For instance, before setting up a normal TCP connection for a TCP session, the client device 110 may setup a TCP connection to a destination (e.g., Google) to which one or more applications running on the client device 110 may connect. The client device 110 may then monitor those connections to measure network parameters (e.g., hop number, RTT, router capability information, etc.) to be used for establishing the normal TCP connection. Additionally or alternatively, the system at the server device 120 (e.g., a system administrator) may setup spare TCP connections to certain destinations (e.g., social media sites, video streaming sites, web browsers, etc.) in order to measure network parameters. According to some aspects, network parameters as disclosed herein may include information associated with the QoS of a given connection, such as the bandwidth, burst, and/or latency of that connection.

At block 204, a TCP connection between the application and system is established using the network parameters measured at block 202. At block 206, a sender such as the client device 110 or a router (e.g., router 130 or 140) may embed OAM information in a TCP data packet of the application. In an embodiment, the sender may embed TCP data packets with OAM information consistently or periodically, and if the latter, the period may be configurable. It is to be understood that OAM information may be embedded in any suitable part of the TCP packet. For example, OAM information may be embedded in a header portion of the TCP data packet, such as an IP header, extension header, or the like. In other examples, OAM information may be embedded elsewhere within the TCP data packet.

Generally speaking, embedding OAM information in TCP packets at block 206 should not impact user data. Rather, such OAM information may be used to detect a current buffer level for each device associated with a TCP flow, and to then determine if the buffer level of any device exceeds a preconfigured threshold. For example, if the buffer level of a device (e.g., router 130 or 140) on the TCP flow path is at or near full capacity, that device may attach a RED signal to OAM information embedded in the TCP packet at block 206. In such cases, the RED signal may be carried in the TCP packet and delivered to the destination (e.g., the destination's receiver host), which may extract the OAM information from the TCP packet and report the RED signal to a source host.

At block 208, the sender may detect a packet loss. In some embodiments, the sender may detect that a packet loss occurred after a TO or upon receiving one or more duplicate ACKs from the destination device. For instance, if the sender sends the destination device a packet that is not received, the destination device cannot send the sender an ACK for that packet. Instead, the destination device may send a duplicate ACK for the last packet received by the destination device (e.g., when the destination device does not receive a subsequent packet within a preset duration after receiving the last packet).

At block 210, the method 200 determines whether the packet loss was due to receiving a predetermined number (e.g., three) of duplicate ACKs or due to a TO (e.g., if the sender does not receive an ACK from the destination device before a TCP timer expires). If the latter, the method 200 proceeds to block 212, where it is determined that the packet loss was likely caused by a long-term or permanent physical failure. If the packet loss detected at block 208 was due to receiving the predetermined number of duplicate ACKs, the method 200 proceeds to block 214, where it is determined whether the packet loss occurred after receiving OAM signaling containing an RED signal. If so, the method 200 proceeds to block 216, where it is determined that the packet loss was likely caused by congestion in the network 100. Otherwise, the method proceeds to block 218, where it is determined that the packet loss at block 208 was likely caused by a random physical failure (e.g., transmission error or packet corruption), i.e., rather than network congestion or buffer overflow. As such, congestion control adjustments need not be necessary since the packet that was lost may simply be resent in accordance with standard TCP retransmission procedures.

Figure 3:
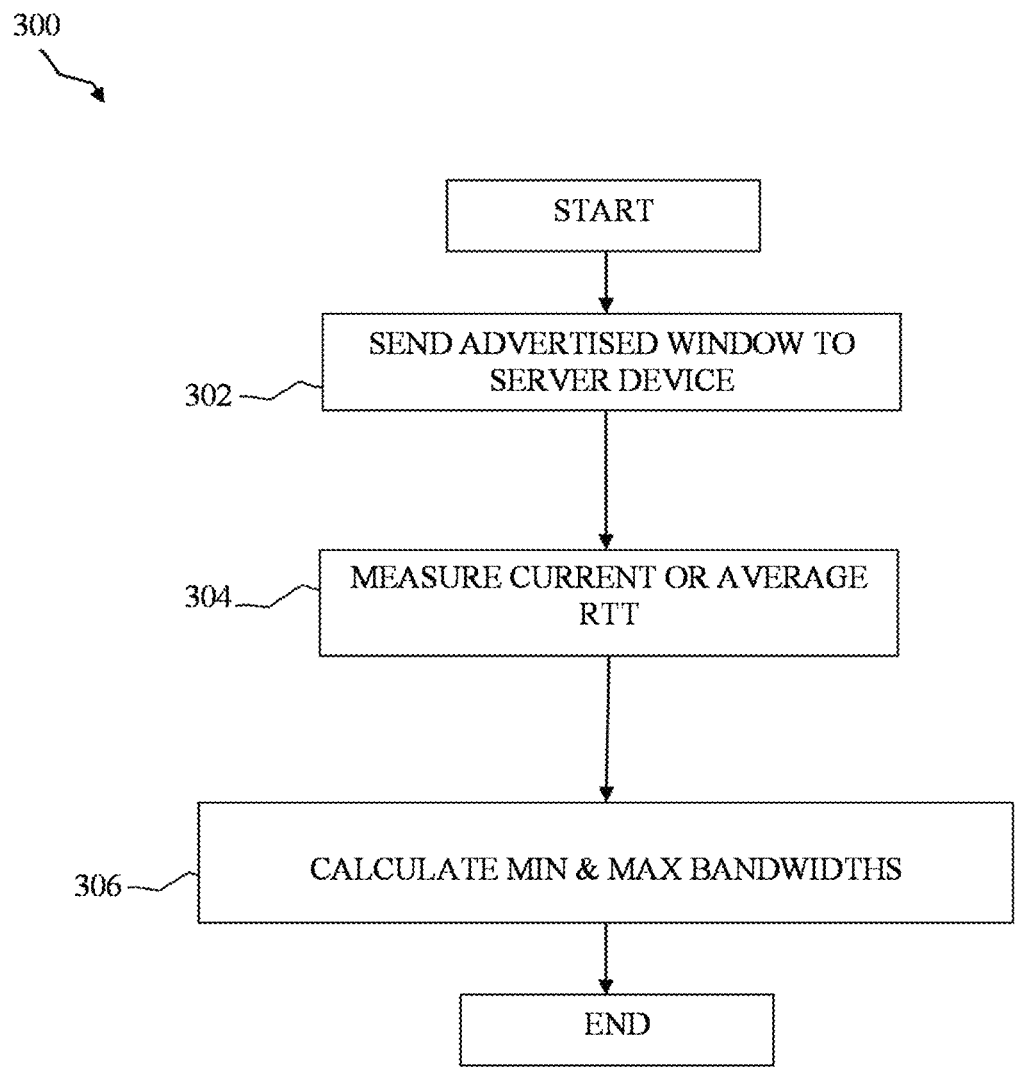
FIG. 3 illustrates a method of setting receiver and sender windows according to an embodiment of the disclosure.

FIG. 3 illustrates a method 300 of setting receiver and sender windows for a session between a receiver and a sender, such as the client device 110 and the server device 120, respectively. At block 302, the client device 110 sends the server device 120 an advertised window (AdvertisedWND), which may represent a limit as to the amount of data that the client device 110 is capable of receiving. In TCP applications, the advertised window may also be known as a Receiver Window (rwnd). The advertised window may be determined according to the following formula: AdvertisedWND=MaxRcvBuffer−(LastByteRcvd−LastByteRead), where AdvertisedWND represents the advertised window, MaxRcvBuffer represents the maximum amount of data that the client device 110 can buffer, LastByteRcvd represents the last byte received by the client device 110, and LastByteRead represents the last byte read by the client device 110. It should be understood that the advertised window may be determined according to different formulas in other embodiments. As the advertised window may change depending on the amount of data that the client device 110 has buffered at any given time, the client device 110 may continually or periodically send the advertised window to the server device 120.

At block 304, the server device 120 measures the current or average RTT. According to some aspects, the average RTT may be measured before a TCP session commences. For example, the server device 120 may determine the average RTT based on historical data and/or network behavior (e.g., a connection with a different client device). Alternatively, the sever device 120 may manually set the average RTT, e.g., to a default value. In an embodiment, the current RTT may be determined according to the following formula (1): RTT=a*old_RTT+(1−a)*new RTT (0<a<1), where a may comprise an experimental value.

In some embodiments, measuring the current or average RTT may comprise the server device 120 measuring an exponential moving average RTT according to the following formula (2): $RTT(t)=a*RTT_M(t)+(1-a)*RTT(t-1)$, where RTT(t) represents the current measurement of the exponential moving average RTT, RTT(t−1) represents the previous measurement of the exponential moving average RTT, $RTT_M(t)$ represents the current measurement of RTT (e.g., according to formula (1)), and a may comprise a constant smoothing factor between 0 and 1. For instance, a may represent the degree of weighting decrease, where greater values of a discount older RTT measurements more quickly.

At block 306, the server device 120 calculates a minimum bandwidth window (MinBandwidthWND) and a maximum bandwidth window (MaxBandwidthWND). In some embodiments, MinBandwidthWND may correspond to CIR, while MaxBandwidthWND may correspond to PIR. In other embodiments, MinBandwidthWND may be determined according to the formula, MinBandwidthWND=CIR*RTT/MSS, while MaxBandwidthWND may be determined according to the formula, MaxBandwidthWND=PIR*RTT/MSS.

In an embodiment, the minimum bandwidth window defines a window size corresponding to CIR, while the maximum bandwidth window defines a window size corresponding to PIR. By comparison, traditional TCP algorithms do not define a maximum window size, and therefore, networks that employ traditional TCP networks may be more prone to congestion as compared to networks employing congestion control schemes according to the present disclosure. For example, by defining a maximum window size such as PIR, the possibility of network congestion and/or long delays may be reduced.

Figure 5:
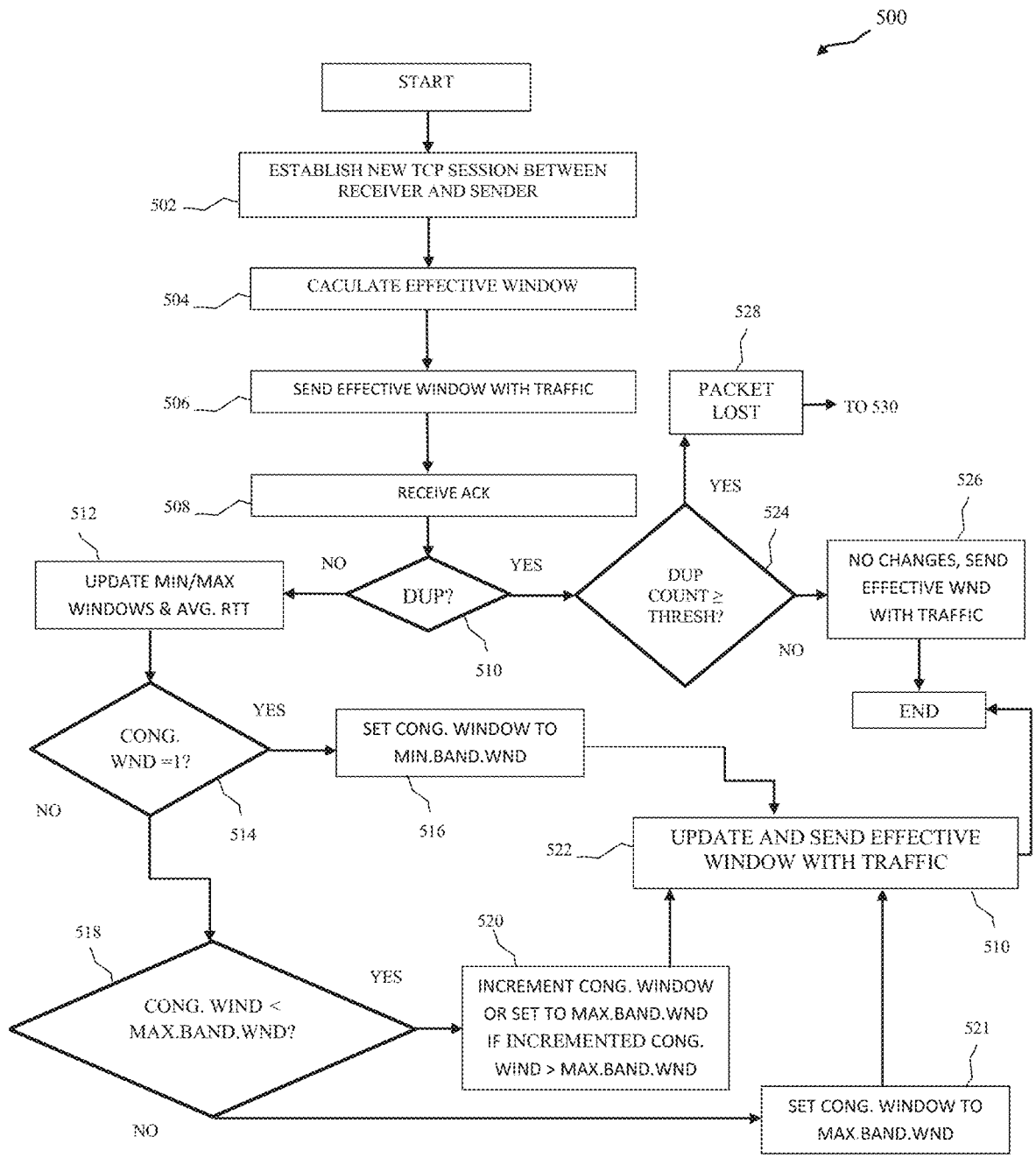
FIG. 5 illustrates a method for providing QoS guarantees according to an embodiment of the disclosure.
Figure 5:
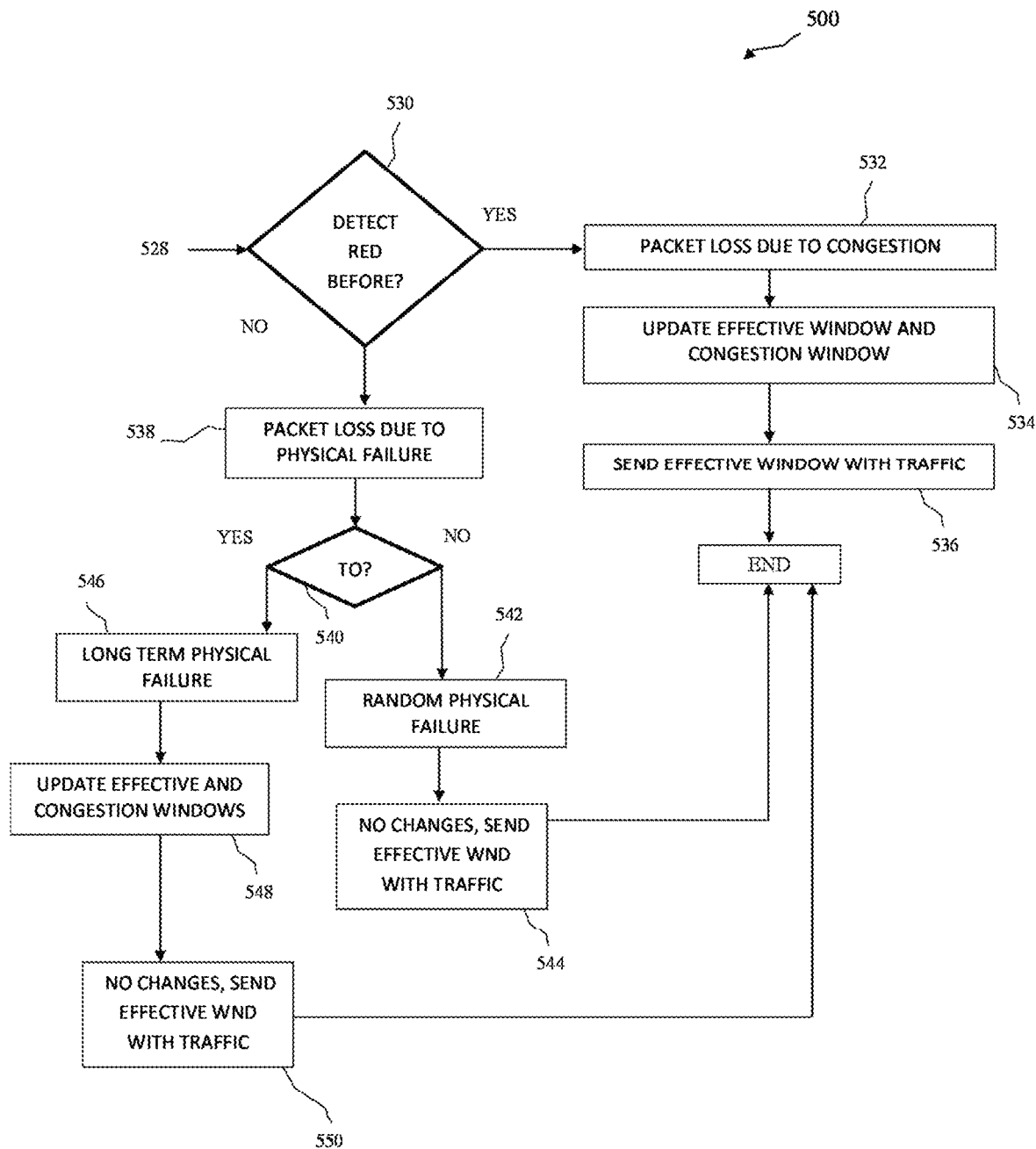

FIG. 4 illustrates pseudo-code 400 for implementing a method 500 as illustrated in FIG. 5, which pertains to a congestion control scheme to provide QoS guarantees in a network (e.g., network 100 of FIG. 1) according to an embodiment of the disclosure. At step 502, a new TCP session is established between a receiver and a sender, such as the client device 110 and the server device 120, respectively. In some embodiments, establishing the new session may entail exchanging QoS requirements such as parameters of a downstream and/or upstream connection. These parameters may include information associated with the QoS of the downstream and/or upstream connection, e.g., bandwidth, burst, latency, etc. For instance, a downstream or upstream QoS requirement may indicate that an IPv4 or IPv6 packet is used to establish a downstream or upstream connection with QoS assurance.

At step 504, the server device 120 calculates an effective window, which may represent the amount of data that can be sent by the server device 120. In an embodiment, the effective window may be calculated according to the following formula, EffectiveWND=CongestionWND=IW=MinBandwidthWND, where EffectiveWND represents the effective window, CongestionWND represents a congestion window, IW represents an initial window, and MinBandwidthWND represents the minimum bandwidth (e.g., such as calculated at block 306 of FIG. 3). When a new session is established such as in step 502, EffectiveWND, CongestionWND, IW, and MinBandwidthWND may all be initialized to be equal to a window size corresponding to CIR. It is to be understood that the effective window may be calculated according to other formulas in other embodiments.

At step 506, the server device 120 sends the client device 110 traffic including the effective window calculated at step 504. Traffic may comprise, for example, any suitable type of data such as that communicated via one or more layers of the Open Systems Interconnection (OSI) model, which includes the Application Layer, the Presentation Layer, the Session Layer, the Transport Layer, the Network Layer, the Data Link Layer, and the Physical Layer. It is to be understood that data may be communicated via one or more of these layers according to any suitable format, e.g., TCP data may be communicated as one or more packets, segments, datagrams, etc. It is also to be understood that such data may contain various types of data such as multimedia data (e.g., text, audio, picture, video), user data (e.g., information requested by a user of the client device 110), and/or application data (e.g., information requested by an application running on the client device 110).

In some embodiments, traffic sent in step 506 may also include an initial RTT such as calculated at block 304 of FIG. 3. To ensure reliability, the method 500 may employ a retransmission scheme such that after receiving traffic sent in step 506, the client device 110 sends the server device 120 an ACK in step 508. It is to be understood that the client device 110 may send an ACK according to any suitable retransmission scheme in other embodiments.

At step 510, the server device 120 determines whether the ACK received from the client device 110 is a duplicate. If not, the server device 120 may infer that the network 100 is not congested and that a packet loss has not occurred. The method 500 may then proceed to step 512, where the server device 120 may update network parameters such as the minimum bandwidth window, the maximum bandwidth window, and the average RTT, which may be calculated as described above with respect to FIG. 3. The method 500 may then proceed to block 514, where it is determined whether the congestion window is equal to one. If so, the method 500 proceeds to employ a fast recovery scheme at step 516, where the congestion window may be set equal to the minimum bandwidth window.

If the congestion window is not equal to one in step 514, the method 500 proceeds to step 518, where the method 500 may employ a feedback scheme (e.g., based on an additive-increase/multiplicative-decrease (AIMD) control algorithm) to adjust the congestion window. For example, if the congestion window is not equal to one, but is less than the maximum bandwidth window, the congestion window may be incremented by one at step 520, except if incrementing the congestion window by one would result in the congestion window exceeding the maximum bandwidth window. If the latter, the congestion window may be set equal to the maximum bandwidth window in step 520. On the other hand, if the congestion window is neither equal to one nor less than the maximum bandwidth window at block 518, method 500 may proceed to block 521 where the congestion window may be set equal to the maximum bandwidth window.

After updating the congestion window at step 516, 520, or 521, the method 500 proceeds to step 522, where the server device 120 may update the effective window. In an embodiment, the effective window may be updated according to the following formula, EffectiveWND=min (CongestionWND, AdvertisedWND)−(LastByteSent−LastByteAcked), where LastByteSent represents the last byte sent by the server device 120 and LastByteAcked represents the last byte acknowledged by the server device 120. Thus, the effective window may be calculated by taking the difference between the last bytes sent and acknowledged by the server device 120, and subtracting that difference by the lesser of the congestion window size and the advertised window size. It is to be understood that the effective window may be updated according to different formulas in other embodiments.

After updating the effective window at step 522, the server device 120 may send the updated effective window to the client device 110. This way, the client device 110 may be provided with an updated indication as to how many bytes the server device 120 can transmit to the client device 110.

If the server device 120 determines at step 510 that the ACK received from the client device 110 is a duplicate, the method 500 may proceed to step 524, where it is determined if the ACK has been received more than a threshold number of times (e.g., if the ACK is a duplicate that has been received three or more times). If not, the method 500 proceeds to step 526, where the server device 120 may conclude that changes to the congestion and effective windows are not necessary. Instead, the server device 120 may send the client device 110 traffic including the effective window that is currently in use. In some aspects, sending traffic in step 526 may include retransmitting data that the client device 110 may not have received (e.g., as implied via detection of the duplicate ACK in step 510).

If server device 120 determines that the ACK has been received more than a threshold number of times in step 524, the method 500 proceeds to step 528, where the server device 120 may infer that a packet loss occurred. In turn, the server device 120 may proceed to determine a likely cause of the packet loss. For example, the method 500 may proceed to step 530, where the server device 120 may determine if an RED signal was received prior to receiving the duplicate ACK more than the threshold number of times. If so, at step 532 the server device 120 may infer that the packet loss likely occurred due to congestion in the network 100.

In turn, the server device 120 may update the congestion window and effective window at step 534. In an embodiment, updating these windows in step 534 may involve setting the congestion window equal to the Minimum Bandwidth window, and setting the effective window according to the following formula: EffectiveWND=min(CongestionWND, AdvertisedWND)−(LastByteSent−LastByteAcked). It is to be understood that the congestion window and/or the effective window may be updated according to any suitable alternative manner in other embodiments.

At step 536, the server device 120 may send the effective window calculated in step 534 to the client device 110 with traffic (e.g., user data, application data, multimedia data, etc.). Such traffic may include one or more packets lost due to congestion as inferred in step 532 (e.g., such as the packet determined to be lost in 528).

If it is determined in step 530 that an RED signal was not received prior to receiving the duplicate ACK more than the threshold number of times, the server device 120 may infer at step 538 that the packet loss occurred due to a physical failure. The method 500 may then proceed to step 540, where the server device 120 may determine a type of physical failure that may have caused the packet loss to occur. For example, if a TO did not take place when the duplicate ACK was received more than the threshold number of times, the method 500 may proceed to step 542, where the server device 120 may infer that the packet loss was likely caused due to a random physical failure.

At step 544, therefore, the server device 120 need not make any changes to the congestion window or effective window. Rather, the server device 120 may simply send the effective window that is currently in use to the client device 110 with traffic, which may include one or more packets likely lost due to random physical failure. However, if the server device 120 determines that a TO did take place when the duplicate ACK was received more than the threshold number of times, the method 500 may proceed to step 546, where the server device 120 may infer that the packet loss was likely due to a long-term physical failure. The server device 120 may then update the effective window and congestion window at step 548. In an embodiment, updating these windows in step 548 may involve the server device 120 setting both the effective window and the congestion window equal to one at step 548. At step 550, the server device 120 may send the effective window from the previous step to the client device 110 with traffic, which may include one or more packets likely lost due to long-term physical failure.

Figure 6:
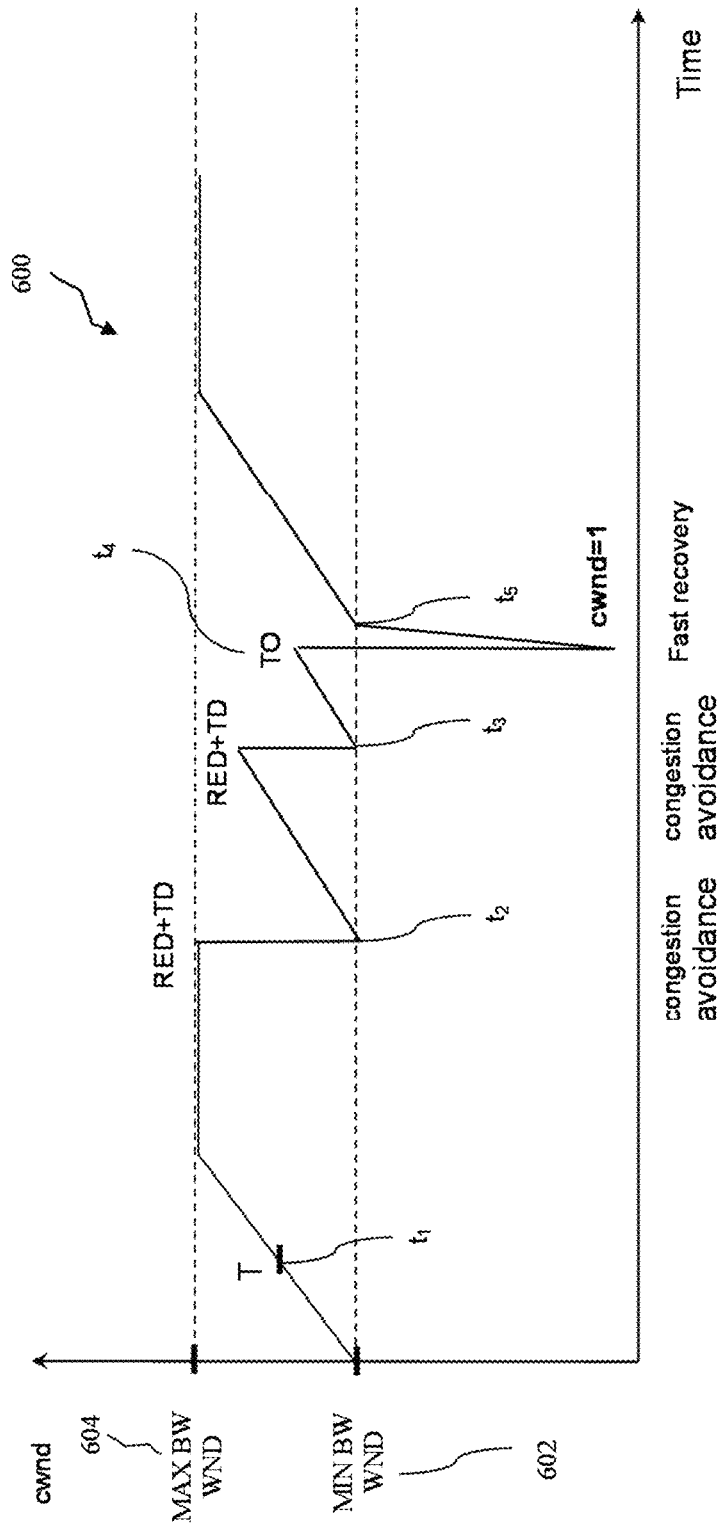
FIG. 6 illustrates a schematic diagram of an example for implementing the method of FIG. 5.

FIG. 6 is a schematic diagram 600 illustrating an example for implementing the method 500 described above with respect to FIG. 5. Unlike traditional TCP algorithms such as TCP Reno, the congestion control scheme according to the present disclosure does not employ a slow start threshold (ssthresh). As indicated at 602, the disclosed congestion control scheme may instead begin immediately with a congestion window equal to a minimum bandwidth window, which may be set to CIR. At $t_1$, a triple duplicate (TD) ACK is received, e.g., by a host such as the server device 120. However, since an RED signal is not received prior to detecting the TD ACK at $t_1$, changes to the congestion window or effective window need not be made. Meanwhile, the congestion window may continue to be incremented until a maximum bandwidth threshold (e.g., PIR) is reached, as indicated at 604.

At $t_2$, another TD may be received, but after detecting an RED signal. As such, the server device 120 may infer that congestion control is needed, and thus, reset the congestion window to the minimum bandwidth window. Thereafter, the congestion window may be incremented until a third TD is received after detecting an RED signal at $t_3$. Thus, the server device 120 may reset the congestion window to the minimum bandwidth window.

The congestion window may subsequently be incremented until a TO is detected at $t_4$, in which case the server device 120 may infer that permanent failure has occurred. As such, the server device 120 may perform a fast recovery procedure in which the congestion window may be reset to a default value, e.g., the congestion window may be set to one. However, if an ACK is subsequently received after initiating the fast recovery procedure, the congestion window may be dynamically changed from one to the minimum bandwidth window, such as shown at $t_5$. In some embodiments, the congestion control schemes described herein may be used to dynamically change the minimum bandwidth window and/or the maximum bandwidth window (e.g., based on network conditions).

Figure 7:
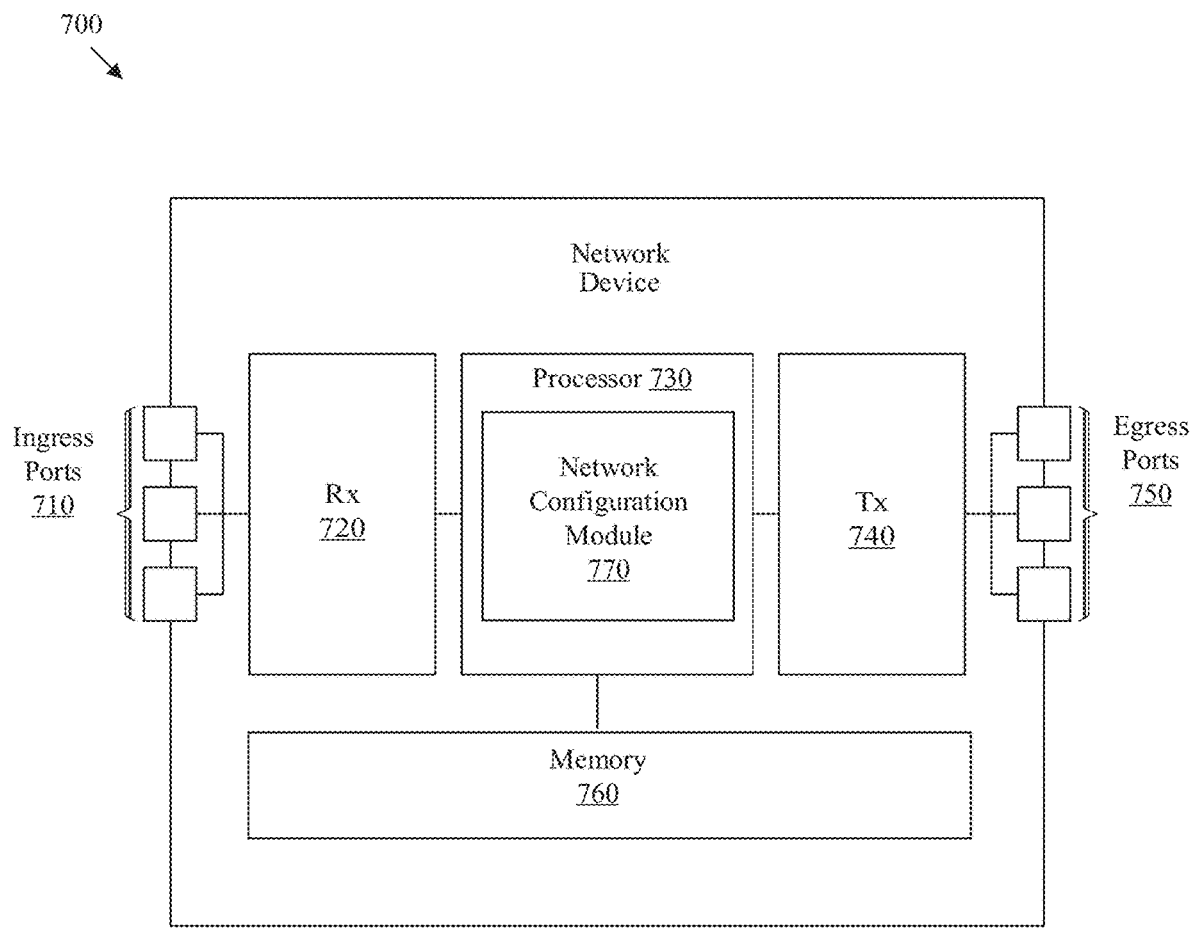
FIG. 7 is a schematic diagram of a network device according to an embodiment of the disclosure.

FIG. 7 is a schematic diagram of a network device 700 according to an embodiment of the disclosure. The network device 700 is suitable for implementing the components described herein (e.g., the client device 110, the routers 130, 140, the server device 120, etc.). The network device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 may be implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 may be in communication with the ingress ports 710, receiver units 720, transmitter units 740, egress ports 750, and memory 760. The processor 730 comprises a congestion control module 770. The congestion control module 770 may implement the disclosed embodiments described above. For instance, the congestion module 770 may implement the methods of FIGS. 2, 3, 5, and/or the pseudo-code 400 of FIG. 4. The inclusion of the congestion control module 770 therefore provides a substantial improvement to the functionality of the device 700 and effects a transformation of the device 700 to a different state. Alternatively, the congestion control module 770 may be implemented as instructions stored in the memory 760 and executed by the processor 730.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (ROM), random-access memory (RAM), ternary content-addressable memory (TCAM), and static random-access memory (SRAM).

Figure 8:
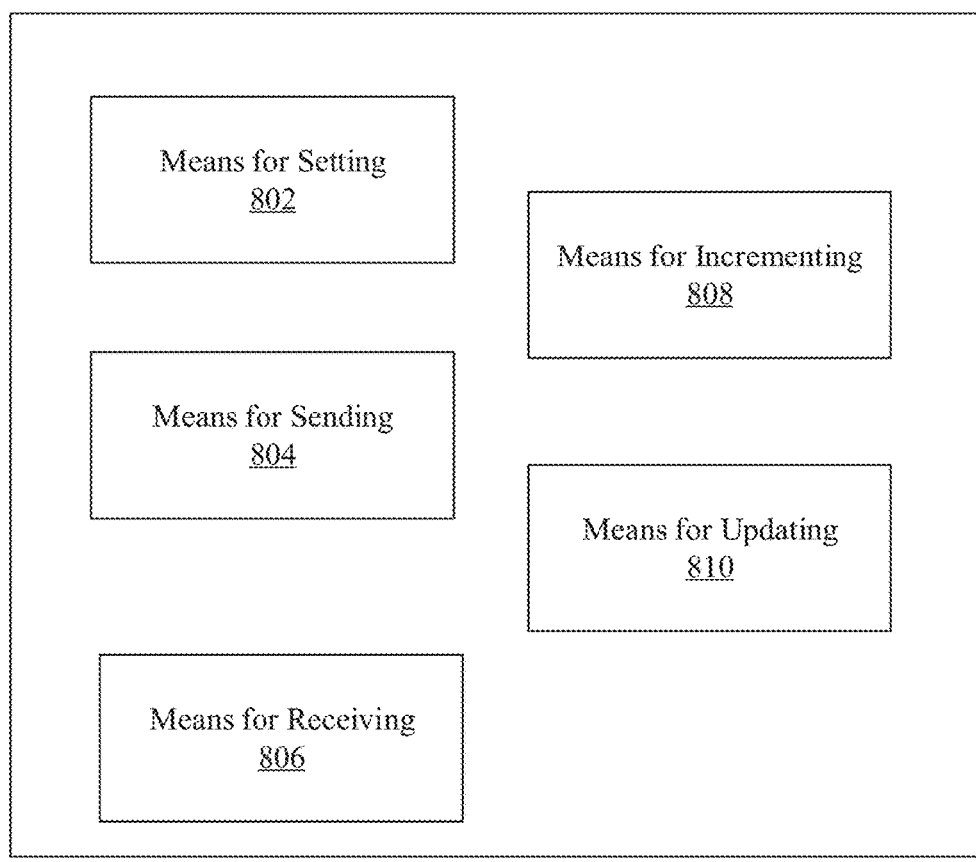
FIG. 8 is a schematic diagram of an apparatus for implementing congestion control schemes and methods according to various embodiments of the disclosure.

FIG. 8 is a schematic diagram of an apparatus 800 for performing congestion control in a network according to various embodiments of the disclosure. The apparatus 800 comprises means for setting 802 an effective window equal to a congestion window; means for sending 804 traffic including the effective window to a client device; means for receiving 806 an ACK from the client device; means for incrementing 808 the congestion window if the ACK is not a duplicate; and means for updating 810 the effective window based at least partly on the incremented congestion window.

Embodiments of the present disclosure provide a method to support congestion control for a bandwidth guaranteed network (e.g., network 100). For instance, a guaranteed bandwidth may be defined to provide guaranteed bandwidth service with at least two bandwidth parameters, e.g., a Minimum Bandwidth or Committed information rate (CIR), and a Maximum Bandwidth or Peak information rate (PIR). In some embodiments, the method may comprise measuring basic network parameters, novel algorithms for detecting and controlling congestion. Measuring network parameters may comprise measuring parameters such as the average Round Trip Time (RTT), two windows corresponding to MinBandwidth (e.g., CIR) and MaxBandwidth (e.g., PIR), the total hop number, and each router's capability.

In some embodiments, the network parameter measurements may be done by setting up a measuring TCP connection, which may not have user data, but may still be used to measure key network parameters. Further, such network parameter measurements may be performed by the system or application. For example, a system (at Sender) may setup a measuring TCP connection to different destinations of interest to collect key network parameters, while an application (at Sender) may setup a measuring TCP connection to the destination to collect key network parameters before setting up the normal TCP connection.

In some embodiments, average RTT may be measured and calculated as described herein. Moreover, at least two windows MinBandwidthWND and MaxBandwidthWND corresponding to a minimum bandwidth window (e.g., CIR) and a maximum bandwidth window (e.g., PIR) may be calculated as described herein.

In some embodiments, the total hop number and each router capability can be detected by OAM. In some embodiments, congestion detection may comprise the detection of OAM RED signaling and data packet loss to infer a random or permanent physical failure caused by packet loss, as well as to infer congestion caused packet loss. For example, an OAM RED signal may be detected at each router to see if its egress buffer exceeds a pre-configured threshold, in which case the OAM RED signal may be indicated. In some embodiments, the OAM RED signal may be carried into user data and processed at the end host and then returned to the source host.

In some embodiments, user data packet loss may be detected by checking if there are a predetermined number (e.g., three or more) of duplicated TCP ACKs received at the source host for any TCP user data with a sequence number. If both an OAM RED signal and user data packet loss are detected, it may be likely that congestion caused packet loss. If an OAM RED signal is not detected, but user data packet loss is detected, it may be likely that a random physical failure caused packet loss. If user data packet loss is detected and a TCP time out occurs, it may be likely that a permanent physical failure caused packet loss.

In some embodiments, the congestion control schemes disclosed herein may comprise novel start, feedback control, and/or fast recovery algorithms. For example, a novel start algorithm according to the disclosure may involve setting an initial window size to a minimum bandwidth window (MinBandwidthWND) when a TCP session starts (e.g., as opposed to using a slow start algorithm). Further, when packet loss occurs in the absence of a timeout, the effective window size may remain set at least at or above the minimum bandwidth window. In contrast, traditional congestion avoidance schemes continue reducing effective window size when packet losses occur, i.e., the effective window size may fall below the minimum bandwidth window in such traditional schemes.

A novel feedback control algorithm may be based on an AIMD model that comprises incrementing the congestion window until it is equal to a maximum bandwidth window (MaxBandwidthWND) when a TCP ACK is received that is not a duplicate. During window increments, if it is determined that congestion likely caused a packet loss, the congestion window may be changed to MinBandwidthWND; if it is determined that a random physical failure likely caused packet loss, the congestion window may not be changed; and if it is determined that a permanent or long-term physical failure likely caused a packet loss, the congestion window may be set to one.

A novel fast recovery algorithm according to the disclosure may be such that if a non-duplicate TCP ACK is received after the congestion window is set to one (e.g., as when packet loss is believed to have occurred due to long-term physical failure), the congestion window may be immediately set to MinBandwidthWND. As such, the congestion window need not be gradually increased during a slow start period as in traditional TCP recovery schemes.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of performing congestion control by a server device in a network, the method comprising:

setting an effective window equal to a congestion window when establishing a new Transmission Control Protocol (TCP) session between the server device and a client device, wherein the effective window indicates an amount of data that the server device is capable of sending;

sending traffic including data identifying the effective window to a client device; receiving an acknowledgment (ACK) from the client device; determining that the ACK is a duplicate ACK that has been previously received by the server device; and sending additional traffic to the client device without changing the effective window and the congestion window when the server device has not received the duplicate ACK at least a predetermined number of times;

wherein the server device in the network further comprising:

receiving an advertised window from the client device; and updating the effective window based upon the following formula:

$$EffecttveWND=\min(CongestionWND, AdvertisedWND)-(LastByteSent-LastByteAcked),$$

where EffectiveWND represents the effective window, CongestionWND represents the congestion window, AdvertisedWND represents the advertised window, LastByteSent represents the last byte sent by the server device, and LastByteAcked represents the last byte acknowledged by the server device, wherein the congestion window indicates a maximum amount of data that can be sent by the server device on a TCP connection without being acknowledged by the client device, and wherein the advertised window indicates a limit on an amount of data that the client device is capable of receiving.

2. The method of claim 1, further comprising:

responsive to determining that the ACK is the duplicate ACK that has been previously received by the server device, determining whether packet loss has occurred in the network; and determining that a packet loss has occurred in the network when the server device has received the duplicate ACK at least the predetermined number of times.

3. The method of claim 1, wherein setting the effective window equal to the congestion window comprises setting both the effective window equal and the congestion window equal to a minimum bandwidth window, and wherein the minimum bandwidth window defines a window size corresponding to a committed information rate (CIR).

4. The method of claim 2, further comprising:

determining that the packet loss was caused by congestion when the server device receives a random early detection (RED) signal from the client device before the server device has received the duplicate ACK at least the predetermined number of times;

resetting the congestion window to a minimum bandwidth window when determining that the packet loss was caused by congestion; and incrementing the minimum bandwidth window by one segment upon receiving a non-duplicate ACK from the client device.

5. The method of claim 2, further comprising determining that the packet loss was caused by a physical failure when the server device does not receive a random early detection (RED) signal from the client device before receiving the duplicate ACK at least the predetermined number of times, wherein determining that the packet loss was caused by the physical failure comprises one of:

determining that the packet loss was caused by a long-term or permanent physical failure when the server device detects that the packet loss was due to a TCP timeout; or determining that the packet loss was caused by a random physical failure when the server device does not detect the TCP timeout.

6. The method of claim 5, further comprising:

setting both the effective window and the congestion window equal to one packet upon determining that the packet loss was caused by the long-term or permanent physical failure; and increasing the congestion window from one packet to a minimum bandwidth window responsive to receiving a non-duplicate ACK from the client device.

7. The method of claim 2, further comprising updating the effective window upon determining that the packet loss was caused by congestion.

8. The method of claim 6, wherein the minimum bandwidth window defines a window size corresponding to a committed information rate (CIR), and wherein the CIR represents a minimum rate or bandwidth for user data.

9. The method of claim 1, further comprising incrementing the congestion window by one segment upon determining that the ACK is a non-duplicate ACK, wherein incrementing the congestion window comprises setting the congestion window less than or equal to a peak information rate (PIR), and wherein the PIR represents a maximum rate or bandwidth for user data.

10. A server device, comprising:

a non-transitory memory comprising instructions; and a processor configured to execute the instructions such that, when executed, the instructions cause the server device to:

set an effective window equal to a congestion window in response to establishing a new Transmission Control Protocol (TCP) session between the server device and a client device, wherein the effective window indicates an amount of data that the server device is capable of sending;

send traffic including data identifying the effective window to the client device; receive an acknowledgment (ACK) from the client device;

determine that the ACK is a duplicate ACK that has been previously received by the server device; and send additional traffic to the client device without changing the effective window and the congestion window when the server device has not received the duplicate ACK at least a predetermined number of times;

wherein executing the instructions further cause the server device to:

receive an advertised window from the client device; and update the effective window based upon the following formula:

EffecttveWND=min(CongestionWND,AdvertisedWND)−(LastByteSent−LastByteAcked), where EffectiveWND represents the effective window, CongestionWND represents the congestion window, AdvertisedWND represents the advertised window, LastByteSent represents the last byte sent by the server device, and LastByteAcked represents the last byte acknowledged by the server device, wherein the congestion window indicates a maximum amount of data that can be sent on a connection without being acknowledged, and wherein the advertised window indicates a limit on an amount of data that the client device is capable of receiving.

11. The server device of claim 10, wherein executing the instructions further cause the server device to:

determine whether packet loss has occurred responsive to determining that the ACK is the duplicate ACK that has been previously received by the server device; and determine that a packet loss has occurred when the server device has received the duplicate ACK at least the predetermined number of times.

12. The server device of claim 11, wherein executing the instructions further cause the server device to:

determine that the packet loss was caused by congestion when the server device receives a random early detection (RED) signal from the client device before the server device has received the duplicate ACK at least the predetermined number of times;

reset the congestion window to a minimum bandwidth window when the server device determines that the packet loss was due to congestion; and increment the minimum bandwidth window by one segment upon receiving a non-duplicate ACK from the client device.

13. The server device of claim 11, wherein executing the instructions further cause the server device to:

determine that the packet loss was caused by a long-term or permanent physical failure when the server device detected the packet loss due to a TCP timeout;

set the congestion window equal to one packet upon determining that the packet loss was caused by the long-term or permanent physical failure; and increase the congestion window from one packet to a minimum bandwidth window responsive to receiving a non-duplicate ACK, wherein the minimum bandwidth window corresponds to a committed information rate (CIR).

14. A non-transitory computer medium storing computer readable instructions, the computer readable instructions adapted to be executed by a processor to implement a method of performing congestion control by a server device in a network, the method comprising:

setting an effective window equal to a congestion window when establishing a new Transmission Control Protocol (TCP) session between the server device and a client device, wherein the effective window indicates an amount of data that the server device is capable of sending;

sending TCP traffic including data identifying the effective window to a client device;

receiving an acknowledgment (ACK) from the client device;

determining that the ACK is a duplicate ACK that has been previously received by the server device; and sending additional TCP traffic to the client device without changing the effective window and the congestion window when the server device has not received the duplicate ACK at least a predetermined number of times;

wherein the method further comprises:

receiving an advertised window from the client device; and updating the effective window based upon the following formula:

$$EffecttveWND=\min(CongestionWND, AdvertisedWND)-(LastByteSent-LastByteAcked),$$

where EffectiveWND represents the effective window, CongestionWND represents the congestion window, AdvertisedWND represents the advertised window, LastByteSent represents the last byte sent by the server device, and LastByteAcked represents the last byte acknowledged by the server device, wherein the congestion window indicates a maximum amount of data that can be sent on a connection without being acknowledged, and wherein the advertised window indicates a limit on an amount of data that the client device is capable of receiving.

15. The non-transitory computer medium of claim 14, wherein the method further comprises:

responsive to determining that the ACK is the duplicate ACK that has been previously received by the server device, determining whether packet loss has occurred in the network; and determining that a packet loss has occurred when the server device has received the duplicate ACK at least the predetermined number of times.

16. The non-transitory computer medium of claim 15, wherein the method further comprises:

determining that the packet loss was caused by congestion when the server device receives a random early detection (RED) signal from the client device before the server device has received the duplicate ACK at least the predetermined number of times;

resetting the congestion window to a minimum bandwidth window when determining that the packet loss was caused by congestion; and incrementing the minimum bandwidth window by one segment upon receiving a non-duplicate ACK from the client device.

17. The non-transitory computer medium of claim 15, wherein the method further comprises:

detecting a long-term or permanent physical failure in the network when the server device detects that the packet loss was due to a TCP timeout;

setting the congestion window equal to one packet upon determining that the packet loss was caused by the long-term or permanent physical failure; and increasing the congestion window from one packet to a minimum bandwidth window responsive to receiving a non-duplicate ACK, wherein the minimum bandwidth window corresponds to a committed information rate (CIR).

* * * * *